US011112780B2

(12) United States Patent
Weaver (10) Patent No.: US 11,112,780 B2
(45) Date of Patent: Sep. 7, 2021

(54) COLLABORATIVE DETERMINATION OF A LOAD FOOTPRINT OF A ROBOTIC VEHICLE

(71) Applicant: Skylla Technologies, Inc., Lexington, MA (US)

(72) Inventor: Kota Weaver, Allston, MA (US)

(73) Assignee: Skylla Technologies, Inc., Lexington, MA (US)

( * ) Notice: Subject to any disclaimer, the term of this patent is extended or adjusted under 35 U.S.C. 154(b) by 236 days.

(21) Appl. No.: 16/296,192

(22) Filed: Mar. 7, 2019

(65) Prior Publication Data

US 2020/0192341 A1 Jun. 18, 2020

Related U.S. Application Data

(60) Provisional application No. 62/639,997, filed on Mar. 7, 2018.

(51) Int. Cl.
*G05B 19/418* (2006.01)
*G05D 1/02* (2020.01)
*B25J 5/00* (2006.01)
*B25J 9/16* (2006.01)

(52) U.S. Cl.
CPC ........ *G05B 19/41895* (2013.01); *B25J 5/007* (2013.01); *B25J 9/1676* (2013.01); *G05B 19/4183* (2013.01); *G05D 1/0246* (2013.01); *G05B 2219/37208* (2013.01); *G05D 2201/0216* (2013.01)

(58) Field of Classification Search
CPC ........... G05B 19/41895; G05B 19/4183; B25J 5/007; B25J 9/1676; G05D 1/0246; G05D 2219/37208; G05D 2201/0216
See application file for complete search history.

(56) References Cited

U.S. PATENT DOCUMENTS

| | | | |
|---|---|---|---|
| 2011/0216185 A1* | 9/2011 | Laws | B66F 9/063 348/121 |
| 2018/0158334 A1* | 6/2018 | Perez Barrera | G08G 1/166 |

* cited by examiner

*Primary Examiner* — Khoi H Tran
*Assistant Examiner* — Nhi Q Bui
(74) *Attorney, Agent, or Firm* — Spano Law Group; Joseph S. Spano (57) ABSTRACT

Methods and systems for collaboration between two robotic vehicle systems to accurately determine a geometric model of the footprint of a loaded robotic vehicle are described herein. A scanning robot is employed to scan a robotic vehicle loaded with a payload. The scanning robot measures the geometric information required to determine a geometric model of the loaded robotic vehicle. The scanning robot traverses a trajectory around the payload robot, while one or more distance sensors repeatedly measure the distance between the scanning robot and the payload robot and one or more image capture devices repeatedly image the payload robot. A geometric model of the footprint of the payload robot is generated based on the collected image and distance information. In some examples, virtual boundaries are defined around the payload robot based on the geometric model to navigate with obstacle avoidance.

17 Claims, 8 Drawing Sheets

COLLABORATIVE DETERMINATION OF A LOAD FOOTPRINT OF A ROBOTIC VEHICLE

CROSS REFERENCE TO RELATED APPLICATIONS

The present application for patent claims priority under 35 U.S.C. § 119 from U.S. provisional patent application Ser. No. 62/639,997, entitled "Collaboratively Determining Load Footprint Of A Robot," filed Mar. 7, 2018, the subject matter of which is incorporated herein by reference in its entirety.

TECHNICAL FIELD

The described embodiments relate to systems and methods for payload transport in a service environment.

BACKGROUND INFORMATION

Robotic systems are widely deployed to perform highly repetitive tasks, typically in a well-controlled, factory environment. In some examples of factory automation, a robot performs a single task repeatedly for long periods of time (e.g., months or years). However, the robotic systems are not yet widely deployed to perform tasks that are part of the everyday lives of humans. To better integrate robotic systems into the everyday lives of humans as well as custom workflows, robotic systems must be able to adapt to new tasks and environmental conditions.

In some examples, robotic systems have been developed with increased intelligence to enable robotic systems to perform a wide range of tasks in unstructured environments. Intelligent robotic systems are able to better comprehend complex tasks and execute the task at hand with less instruction. In addition, improved user interfaces enhance communication between humans and a robotic system; enabling the collaborative robotic system to better understand the task at hand. Recent improvements to user interfaces include the use of natural user interfaces and the use of speech and gesture based technologies to improve usability of robots. However, these approaches focus on communicating task goals and constraints to the collaborative robotic system for execution solely by the robotic system. This limits the complexity of the task that can be accomplished by the robotic system due to limitations in the physical and intellectual capability of the robotic system and limitations in the ability to communicate task parameters and constraints to the robotic system.

A critical element of the navigation subsystem of a robotic vehicle is an internal model of the geometry of the robotic vehicle. This internal model enables the robotic vehicle to perform path planning and execute obstacle avoidance, as well as facilitate physical interactions with the surrounding environment. Models of the geometry of the robotic vehicle are often fixed models that are preprogrammed into the robotic system. However, this approach does not accommodate situations where the robotic vehicle payload changes over time. Cameras and other sensors on-board the robotic vehicle may be used to estimate the shape and size of a payload to determine the overall footprint of the robotic system. Unfortunately, it is often not feasible to include enough sensors with a sufficient field of view to accurately determine the size and shape of a payload when the payload is significantly larger than the robotic vehicle itself.

If a robotic vehicle has the opportunity to scan a payload before onboarding, the robotic vehicle may be able to estimate the size and shape of the payload with sufficient accuracy. However, if the payload is placed on the robotic vehicle, for example by a human or another mechanical system, in an unstructured manner, any available size and shape information cannot be easily relayed to the robot to accurately determine the footprint of the loaded robotic vehicle. To overcome this limitation, the robotic vehicle may be required to assume a very conservative navigation model, or rely on human input to identify a more accurate footprint estimate.

In summary, improvements to robotic systems are desired to enable high accuracy geometric modelling of a loaded robotic vehicle to enhance navigation in highly unstructured environments.

SUMMARY

Methods and systems for collaboration between two robotic vehicle systems to accurately determine a geometric model of the footprint of a loaded robotic vehicle are described herein. A scanning robot is employed to scan a robotic vehicle loaded with a payload. The scanning robot measures the geometric information required to determine a geometric model of the loaded robotic vehicle.

The scanning robot traverses a trajectory around the payload robot, while one or more distance sensors repeatedly measure the distance between the scanning robot and the payload robot and one or more image capture devices repeatedly image the payload robot.

In one aspect, a computing system spatially locates the payload robot with respect to the scanning robot based on a collected sequence of images that include images of fiducial tags mounted to the payload robot.

In another aspect, the computing system detects a number of geometric feature points of payload robot from the collected sequence of images and distances. In some embodiments, the geometric feature points are corner points identified using standard, open source feature detector software such as the Shi-Tomasi corner detector, good features to track detector, Features from Accelerated Segment Test (FAST) detector, etc. In some embodiments, the feature detector is applied to all three color channels of each captured image along with the distance data.

In another aspect, the computing system computes position estimates of the detected feature points with respect to the coordinate frame fixed to the payload robot 100 using a homography. The estimates are refined by filtering the localization results through a Kalman filter associated with the known position and velocity of the scanning robot.

In some embodiments, the computing system filters the geometric feature points by distance and clusters the filtered geometric feature points. In some embodiments, a clustering algorithm such as agglomerative hierarchal clustering is employed. Any points located in the same cluster as the center point of the platform of the payload robot 100 are retained; the rest are discarded.

In some embodiments, a Kalman filter with a model for velocity and position is applied to each geometric feature point to reduce variance.

In another aspect, the computing system matches geometric feature points between each subsequent image frame. In some embodiments, a scale and rotation invariant feature descriptor such as Binary Robust Independent Elementary Features (BRIEF) is employed to perform the matching. In some embodiments, duplicate feature points are merged. In one example, feature points within two standard deviations of each other are merged.

After locating the set of geometric feature points, a mesh is created. In some embodiments, a mesh is generated by Poisson surface reconstruction. In some other embodiments, a simple bounding box mesh parameterized by the minimum and maximum values in each of the axes in the coordinate frame of the payload robot is generated.

After mesh generation, the mesh data is communicated to the payload robot. The payload robot updates the geometric model of its own footprint, including the payload. In some embodiments, the payload robot utilizes a two dimensional model of its footprint. In these embodiments, the three dimensional geometric model is flattened via orthographic projection from the top.

In a further aspect, virtual boundaries around the payload robot are defined based on a geometric model of the payload robot. In some examples, the virtual boundaries are employed to perform navigation tasks with obstacle avoidance.

The foregoing is a summary and thus contains, by necessity, simplifications, generalizations, and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for collaboration between two robotic vehicle systems to accurately determine a geometric model of the footprint of a loaded robotic vehicle are described herein. A second robotic vehicle is employed to scan the loaded robotic vehicle and provide the geometric information required to determine a geometric model of the loaded robotic vehicle.

Figure 1:
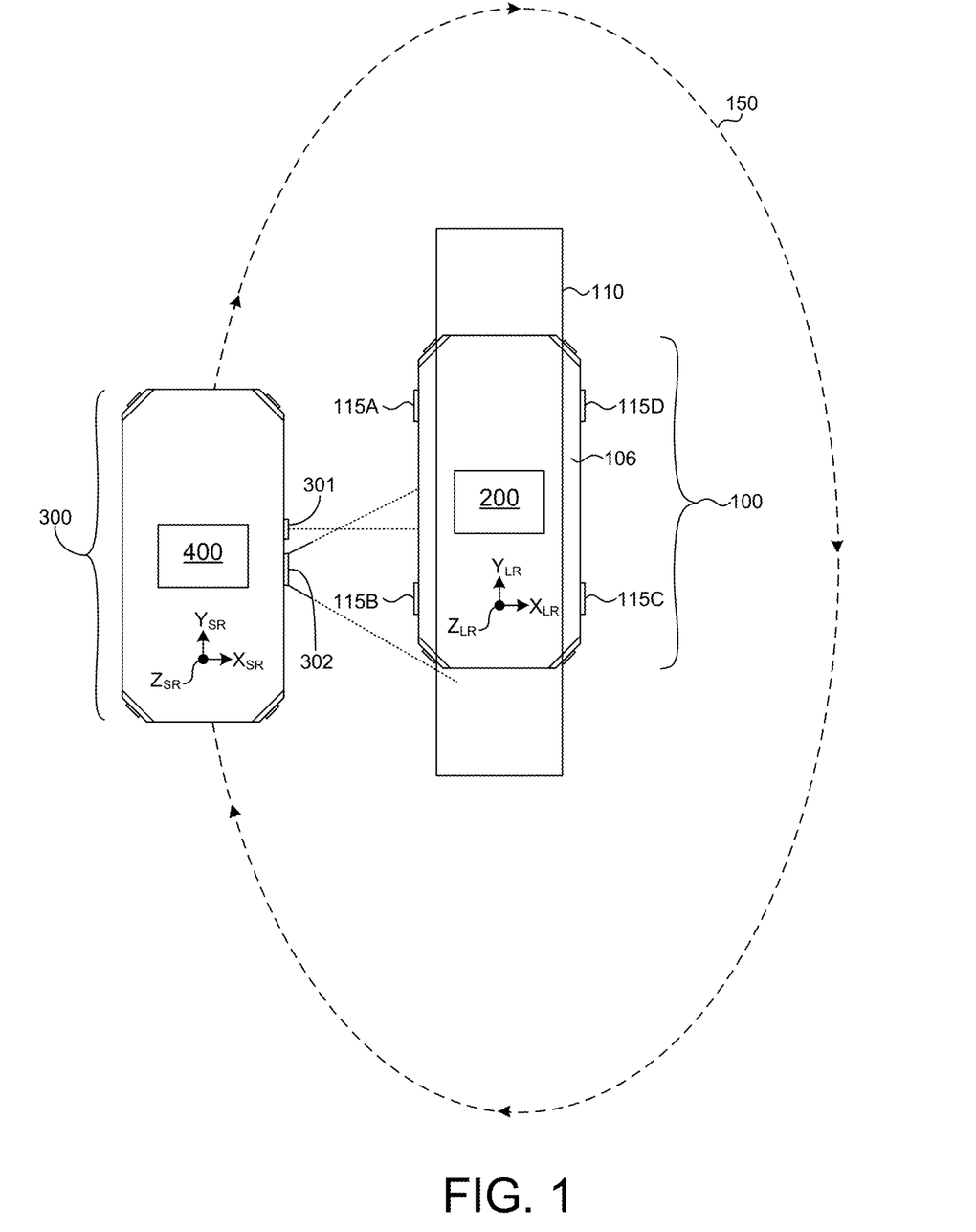
FIG. 1 is a diagram illustrative of a scanning robot traversing a trajectory around a payload robot to build a geometric model of the payload robot including its payload.

FIG. 1 is a diagram illustrative of a scanning robot traversing a trajectory around a payload robot to build a geometric model of the payload robot including its payload. As depicted in FIG. 1, scanning robot 300 traverses a trajectory 150 around payload robot 100 loaded with payload 110. As depicted in FIG. 1, scanning robot 300 includes a computing system 400, one or more distance sensors 301, and one or more imaging devices 302. Coordinate frame $\{X_{SR}, Y_{SR},$ and $Z_{SR}\}$ is attached to scanning robot 300. Payload robot 100 includes computing system 200, payload platform 106, payload 110, and fiducial tags 115A-D. Coordinate frame $\{X_{LR}, Y_{LR},$ and $Z_{LR}\}$ is attached to payload robot 100.

Figure 2:
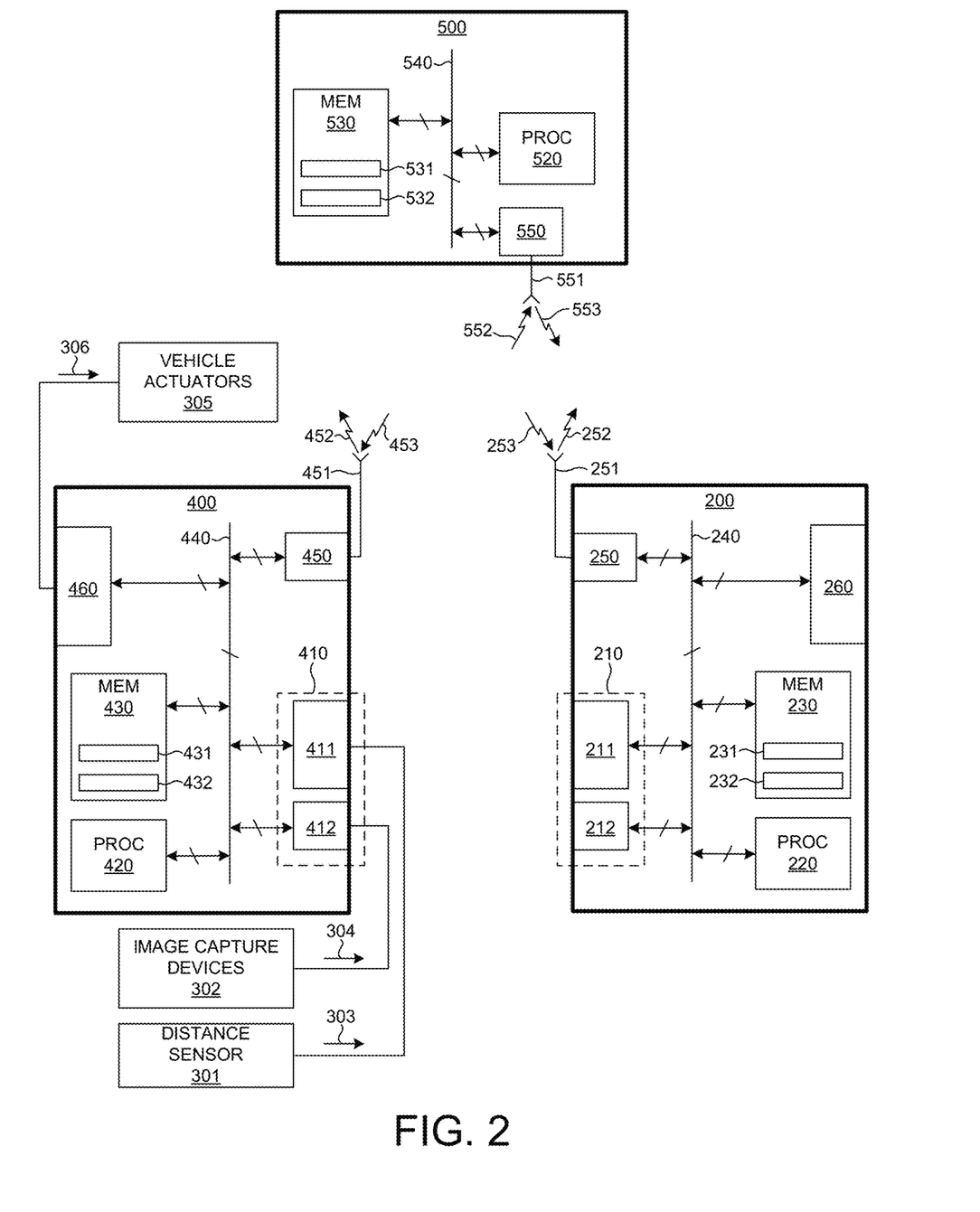
FIG. 2 is a schematic diagram illustrative of elements of a system for collaboratively determining the load footprint of a payload robot.

As depicted in FIGS. 1-2, scanning robot 300 includes one or more actuators 305 that cause the scanning robot to move along trajectory 150 around payload robot 100 in response to command signals 306 received from computing system 400. One or more distance sensors 301 repeatedly measures the distance to the payload robot 100 as the scanning robot 300 traverses the commanded trajectory 150.

Signals 303 indicative of the sequence of distances measured by the one or more distance sensors are communicated to computing system 400. In addition, one or more image capture devices 302 repeatedly images the payload robot 100 as the scanning robot 300 traverses the commanded trajectory 150. Signals 304 indicative of the sequence of images captured by the one or more image capture devices are communicated to computing system 400. In some embodiments, the field of view of the one or more image capture devices includes the field of view of the one or more distance sensors. In some embodiments, an image capture device 302 is a three channel camera (e.g., RGB camera) that generates images with having three different color channels.

In some embodiments, computing system 400 spatially locates the payload robot 100 with respect to the scanning robot 300 based on the collected sequence of images. In the embodiment depicted in FIGS. 1-2, the collected sequence of images includes images of fiducial tags 115A-D within the field of view of the one or more imaging devices. The images of the fiducial tags are analyzed by computing system 400 to estimate the location of payload robot 100 with respect to the scanning robot 300 using one or more suitable localization algorithms. In some embodiments, the fiducial tags are AprilTags. Both AprilTags and associated localization software are freely available from the University of Michigan (USA) at the following Internet address: https://april.eecs.umich.edu/software/apriltaa.html.

Computing system 400 also detects a number of geometric feature points of payload robot 100 from the collected sequence of images and distances. In some embodiments, the geometric feature points are corner points identified using standard, open source feature detector software such as the Shi-Tomasi corner detector, good features to track detector, Features from Accelerated Segment Test (FAST) detector, etc. In some embodiments, the feature detector is applied to all three color channels of each captured image along with the distance data.

Computing system 400 also computes position estimates of the detected feature points with respect to the coordinate frame fixed to the payload robot 100 using a homography. The estimates are refined by filtering the localization results through a Kalman filter associated with the known position and velocity of scanning robot 300. As scanning robot 300 traverses around the payload robot 100, the positions of key feature points are recorded.

In some embodiments, computing system 400 filters the geometric feature points by distance and clusters the filtered geometric feature points. In some embodiments, a clustering algorithm such as agglomerative hierarchal clustering is employed. Any points located in the same cluster as the center point of the platform of the payload robot 100 are retained; the rest are discarded. Thus, there must be sufficient space between payload robot 100 and surrounding objects when scanning payload robot 100 by scanning robot 300.

In some embodiments, a Kalman filter with a model for velocity and position is applied to each geometric feature point to reduce variance.

Computing system 400 also matches geometric feature points between each subsequent image frame. In some embodiments, a scale and rotation invariant feature descriptor such as Binary Robust Independent Elementary Features (BRIEF) is employed to perform the matching. In some embodiments, duplicate feature points are merged. In one example, feature points within two standard deviations of each other are merged. A scan of payload robot 100 is complete after scanning robot 300 has traversed a trajectory that completely encircles payload robot 100.

After locating the set of geometric feature points, a mesh is created. In some embodiments, a mesh is generated by Poisson surface reconstruction. In some other embodiments, a simple bounding box mesh parameterized by the minimum and maximum values in each of the axes in the coordinate frame of payload robot 100 is generated. As payload robot 100 moves the entire system including both the payload and the robotic vehicle itself, feature points associated with the robotic vehicle are not filtered out.

After mesh generation, the mesh data (i.e., the geometric model of the payload robot 100) is communicated to the payload robot 100. Payload robot 100 updates the geometric model of its own footprint, including the payload. In some embodiments, payload robot 100 utilizes a two dimensional model of its footprint. In these embodiments, the three dimensional geometric model is flattened via orthographic projection from the top.

FIG. 2 is a schematic diagram illustrative of elements of a system for collaboratively determining the load footprint of a payload robot. In some embodiments, payload robot 100 requests a scan of its footprint after an unknown load is placed on payload platform 106. In some examples, payload robot 100 communicates a scan request over a peer-to-peer network. Scanning robot 300 receives this request and responds directly to scanning robot 300. In some other examples, payload robot communicates a scan request to server 500. In turn, server 500 broadcasts the scan request, identification number, and location of payload robot 100. Server 500 conducts a search for any scanning robots that are nearby that are not currently undertaking any tasks. Server 500 selects a scanning robot (e.g., scanning robot 300) and notifies the scanning robot to conduct the scan.

As depicted in FIG. 2, computing system 400 includes a sensor interface 410, at least one processor 420, a memory 430, a bus 440, a wireless communication transceiver 450, and a controlled device interface 460. Sensor interface 410, processor 420, memory 430, wireless communication transceiver 450, and controlled device interface 460 are configured to communicate over bus 440.

Sensor interface 410 includes analog to digital conversion (ADC) electronics 411. In addition, in some embodiments, sensor interface 410 includes a digital input/output interface 412. In some other embodiments, sensor interface 410 includes a wireless communications transceiver (not shown) configured to communicate with a sensor to receive measurement data from the sensor.

As depicted in FIG. 2, ADC 411 is configured to receive signals 303 from distance sensor 301. ADC 411 is further configured to convert the analog signals 303 into equivalent digital signals suitable for digital storage and further digital processing. ADC 411 is selected to ensure that the resulting digital signal is a suitably accurate representation of the incoming analog signals (i.e., quantization and temporal discretization errors are within acceptable error levels). In some other embodiments, distance sensor 301 includes signal capture and processing capability on-board. In these embodiments, distance data are communicated digitally to computing system 400.

As depicted in FIG. 2, digital I/O 412 is configured to receive digital signals 304 from image capture device 302. In this example, image capture device 302 includes on-board electronics to generate digital signals 304 indicative of captured images. In this manner, computing system 400 is configured to interface with both analog and digital sensors. In general, any of the sensors described herein may be digital or analog sensors, and may be communicatively coupled to computing system 400 by the appropriate interface.

Controlled device interface 460 includes appropriate digital to analog conversion (DAC) electronics. In addition, in some embodiments, controlled device interface 460 includes a digital input/output interface. In some other embodiments, controlled device interface 460 includes a wireless communications transceiver configured to communicate with a device, including the transmission of control signals.

As depicted in FIG. 2, controlled device interface 460 is configured to transmit control commands 306 to one or more vehicle actuators 305 that cause the scanning robot 300 to move, for example, along a desired motion trajectory.

Memory 430 includes an amount of memory 431 that stores sensor data employed by scanning robot 300 to estimate a geometric model of payload robot 100. Memory 430 also includes an amount of memory 432 that stores program code that, when executed by processor 420, causes processor 420 to implement payload scanning task execution functionality as described herein.

In some examples, processor 420 is configured to store digital signals generated by sensor interface 410 onto memory 430. In addition, processor 420 is configured to read the digital signals stored on memory 430 and transmit the digital signals to wireless communication transceiver 450. In some embodiments, wireless communications transceiver 450 is configured to communicate the digital signals from computing system 400 to server 500, computing system 200, or an external computing device (not shown) over a wireless communications link. As depicted in FIG. 2, wireless communications transceiver 450 transmits a radio frequency signal 452 over antenna 451. The radio frequency signal 452 includes digital information indicative of the digital signals to be communicated from computing system 400 to the external computing device. In one example, sensor data generated by computer system 200 are communicated to server 500, computing system 200, or an external computing system (not shown) for purposes of scanning and generating a geometric model of payload robot 100 based on the sensor data.

In some embodiments, wireless communications transceiver 450 is configured to receive digital signals from server 500, computing system 200, or an external computing device (not shown) over a wireless communications link. The radio frequency signals 453 includes digital information indicative of the digital signals to be communicated from server 500, computing system 200, or an external computing system (not shown) to computing system 400.

As depicted in FIG. 2, server 500 includes at least one processor 520, a memory 530, a bus 540, and a wireless communication transceiver 550. Processor 520, memory 530, and wireless communication transceiver 550 are configured to communicate over bus 540.

In some embodiments, memory 530 includes an amount of memory 531 that stores sensor data scanned by scanning robot 300, mesh data associated with a geometric model of payload robot 100, etc. Memory 530 also includes an amount of memory 532 that stores program code that, when executed by processor 520, causes processor 520 to generate a geometric model of payload robot 100 based on sensor data collected by scanning robot 300 as described herein.

In some examples, processor 520 is configured to store digital signals received from computing systems 400 and 200 onto memory 530. In addition, processor 520 is configured to read the digital signals stored on memory 530 and transmit the digital signals to wireless communication transceiver 550. In some embodiments, wireless communications transceiver 550 is configured to communicate the digital signals from server 500 to computing system 400, computing system 200, or an external computing device (not shown) over a wireless communications link. As depicted in FIG. 2, wireless communications transceiver 550 transmits a radio frequency signal 552 over antenna 551. The radio frequency signal 552 includes digital information indicative of the digital signals to be communicated from server 500 to computing system 400, computing system 200, an external computing device, etc.

In some embodiments, wireless communications transceiver 550 is configured to receive digital signals from computing system 400, computing system 200, or an external computing device (not shown) over a wireless communications link. The radio frequency signals 553 includes digital information indicative of the digital signals to be communicated from computing system 400, computing system 200, or an external computing system (not shown) to server 500.

In some embodiments, the scanning of payload robot 100 and geometric model building is performed by computing system 400, and server 500 serves simply to communicate mesh data from computing system 400 to computing system 200. Alternatively, computing systems 400 and 200 communicate directly and server 500 is not employed at all. However, in some embodiments, server 500 is employed to perform some or all of the calculation required to generate a geometric model of payload robot 100 from image and distance data generated by scanning robot 300.

Figure 3:
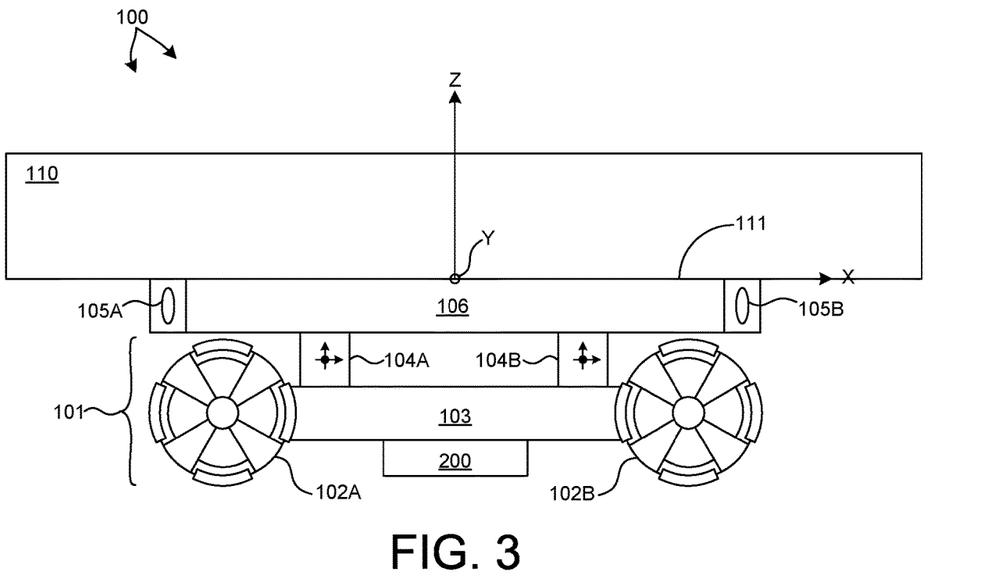
FIG. 3 is a diagram illustrative of an embodiment of a payload robotic system 100 including a wheeled, robotic vehicle and payload platform in side view.
Figure 4:
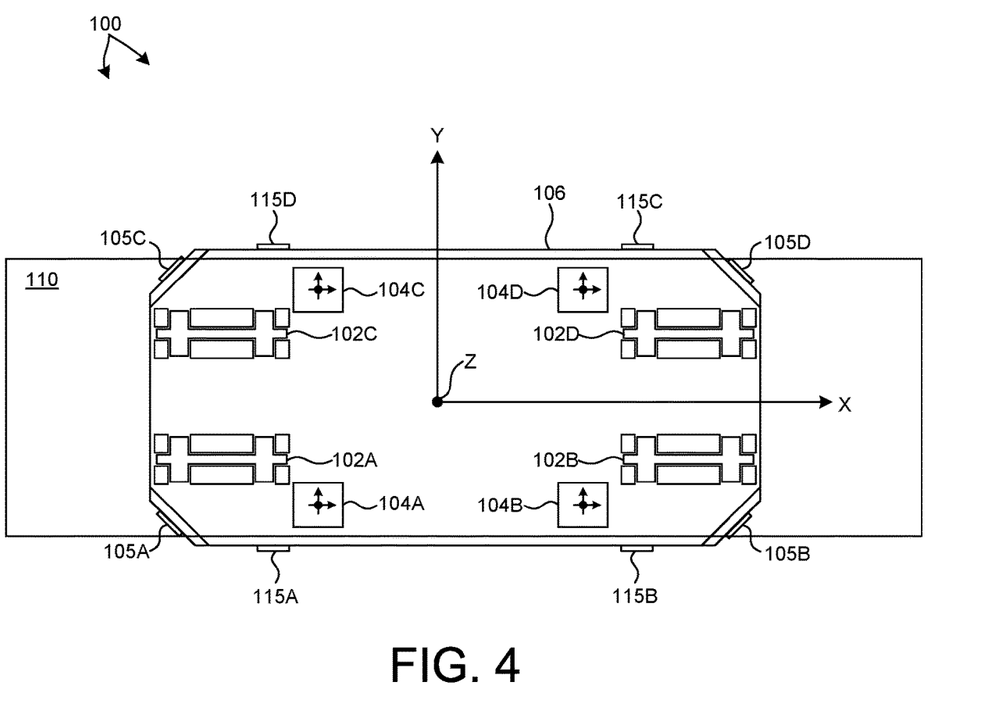
FIG. 4 is a diagram illustrative of an embodiment of a payload robotic system 100 including a wheeled, robotic vehicle and payload platform in top view.

FIGS. 3 and 4 depict a side view and a top view of payload robotic system 100, respectively, in one embodiment. Payload robotic system 100 includes a wheeled, robotic vehicle 101 with one or more actuated wheels (e.g., actuated wheels 102A-D) attached to a frame 103 of the vehicle 101. In some embodiments, wheeled, robotic vehicle 101 is an omni-directional robotic vehicle capable of translating in any direction in the xy plane and rotating about any axis parallel to the z-axis. In some of these embodiments, wheeled, robotic vehicle 101 is also holonomic, and thus is capable of independently translating in the xy plane and rotating about any axis parallel to the z-axis. In some embodiments, the one or more actuated wheels include a mecanum wheel, an omni-directional wheel, or any combination thereof. In one embodiment, wheeled, robotic vehicle 101 employs four mecanum wheels in direct drive. Computing system 200 communicates control commands to the actuated wheels of the wheeled, robotic vehicle that cause the wheeled, robotic vehicle to move in a desired direction in the xy plane and rotate about a desired axis parallel to the z-axis.

As depicted in FIGS. 3 and 4, collaborative robotic system 100 also includes a payload platform 106 configured to carry a payload 110. In some embodiments, payload robotic system 100 includes one or more payload platform actuators (not shown) attached to the frame and the payload platform. The payload platform actuators are configured to move the payload platform in a direction normal to the load carrying surface of the payload platform. In this manner, payload robotic system 100 is able to adjust a height of the payload platform 106 to meet the requirements of a variety of transportation tasks.

As depicted in FIG. 3, payload robotic system 100 includes load sensors (e.g., load sensors 104A-D). In the embodiment depicted in FIG. 3, load sensors 104A-D are coupled to payload platform 106 and frame 103. In general, load sensors 104A-D may be located in any suitable location in a load path between payload platform 106 and the actuated wheels (e.g., actuated wheels 102A-D). The load sensors are employed to analyze the distribution of load on the payload platform.

In some embodiments, load sensors of collaborative robotic system 100 measure forces in a plane parallel to the loading surface of the payload platform. In the embodiment depicted in FIGS. 3 and 4, load sensors 104A-D measure forces in a plane parallel to the xy plane. Signals generated by load sensors 104A-D are communicated to computing system 200 for further processing.

In some embodiments, a payload robotic system includes one or more proximity sensors configured to estimate the proximity of objects to the robotic system. In general, payload robotic system 100 includes proximity sensors of any suitable type. By way of non-limiting example, payload robotic system 100 may include proximity sensors such as capacitive sensors, Doppler effect sensors, Eddy-current sensors, inductive sensors, magnetic sensors, optical sensors, photoelectric sensors, photocell sensors, laser rangefinder sensors, passive sensors (e.g., charge-coupled devices), passive thermal infrared sensors, Radar sensors, sensors based on reflection of ionizing radiation, Sonar based sensors, ultrasonic sensors, fiber optic sensors, Hall effect sensors, or any combination thereof.

In some embodiments, proximity sensors include three dimensional sensors (e.g., three dimensional LIDAR sensors, stereoscopic cameras, time-of-flight cameras, monocular depth cameras, etc.) located along the perimeter of robotic system 100 (e.g., along the front, sides, back, of robotic system 100, or any combination thereof). In some embodiments, RGB color information is employed in conjunction with depth data to estimate the proximity of objects relative to robotic system 100.

Proximity sensors of payload robotic system 100 may be coupled to the wheeled, robotic vehicle 101 in any suitable manner. In some examples, the proximity sensors are coupled to frame 103. In the embodiment depicted in FIGS. 3 and 4, the proximity sensors 104A-D are coupled to the payload platform 106. Signals generated by proximity sensors 105A-D are communicated to computing system 200 for further processing.

In some embodiments, payload robotic system 100 includes one or more image capture devices (e.g., charge coupled device (CCD) camera, complementary metal on silicon (CMOS) camera, etc.) also configured to estimate the proximity of objects to the robotic system. Signals generated by the image capture devices are communicated to computing system 200 for further processing.

FIG. 4 depicts a top view of the wheeled, robotic vehicle 101 and payload platform 106 of payload robotic system 100. As depicted in FIG. 4, wheeled robotic vehicle 101 includes actuated drive wheels 102A-D. The relative angular velocity of each of the actuated drive wheels 102A-D controls both the direction of the motion trajectory and the velocity along the motion trajectory of the wheeled, robotic vehicle 101. Signals generated by computing system 200 are communicated to actuated drive wheels 102A-D that causes the actuated drive wheels to move wheeled, robotic vehicle 101 along a desired motion trajectory at a desired velocity.

In some other embodiments, one or more wheels of wheeled robotic vehicle 101 are passive wheels that are free to rotate about multiple axes. In these embodiments, passive wheels function primarily to support the load normal to the ground surface, while the rotations of actuated drive wheels dictate the motion trajectory of the wheeled, robotic vehicle 101. In some other embodiments, the orientation of one or more passive wheels about an axis normal to the ground surface is actively controlled. In these embodiments, these steering wheels also function to control the direction of the motion trajectory of the wheeled, robotic vehicle 101. In some other embodiments, both the rotation of steering wheels and the orientation of steering wheels about an axis normal to the ground surface are actively controlled. In these embodiments, steering wheels function to control both the direction of the motion trajectory and the velocity along the motion trajectory of the wheeled, robotic vehicle 101.

Figure 5:
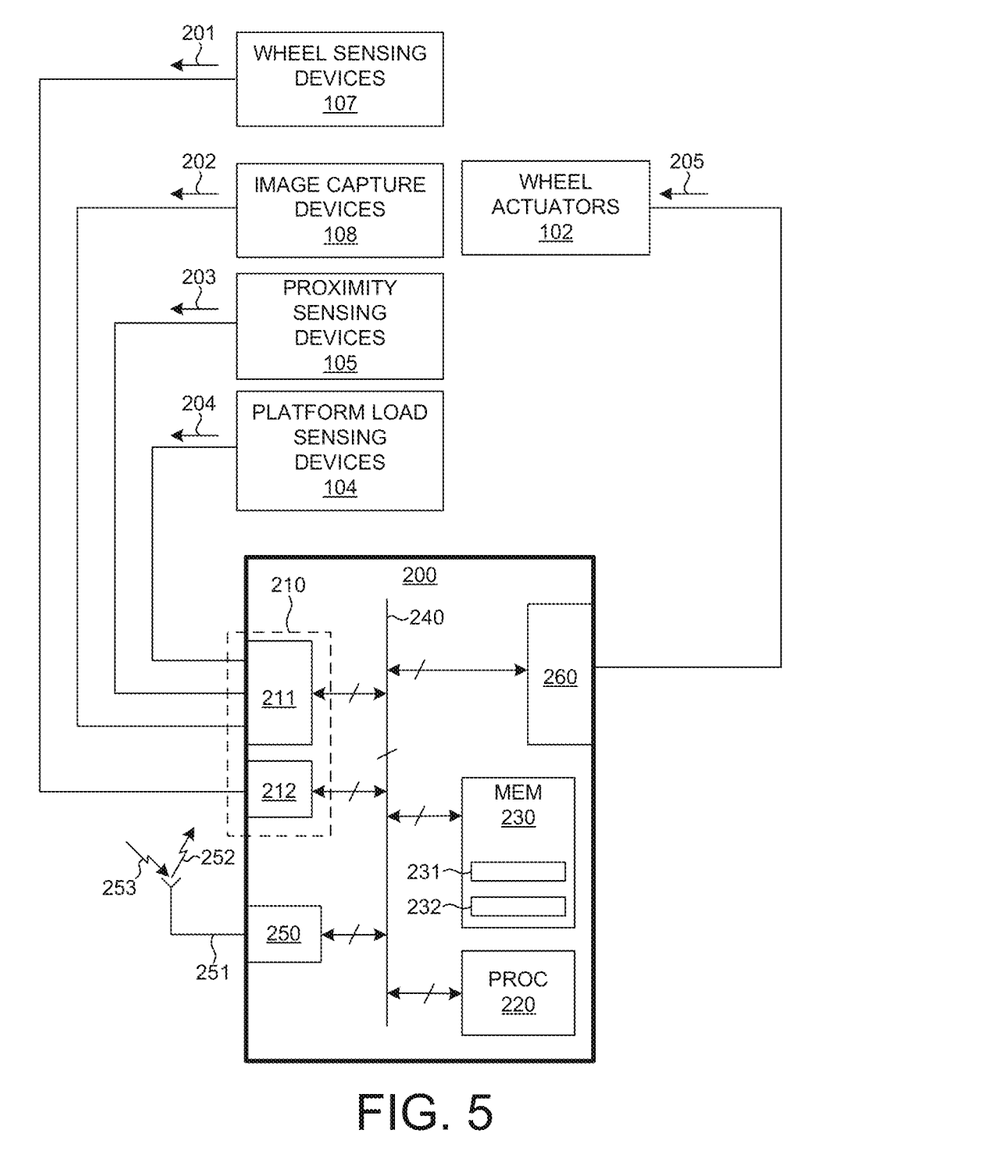
FIG. 5 is a schematic diagram illustrative of some elements of a payload robotic system 100.

FIG. 5 is a diagram illustrative of elements of robotic system 100 including computing system 200, platform load sensing devices 104, wheel sensing devices 107 (e.g., encoders, wheel speed sensors, etc., located at each actuated wheel), proximity sensing devices 105, image capture devices 108, and wheel actuators 102. In the embodiment depicted in FIG. 5, computing system 200 is communicatively coupled to platform load sensing devices 104, wheel sensing devices 107 (e.g., encoders located at each actuated wheel), proximity sensing devices 105, image capture devices 108, and wheel actuators 102 by wired communications links. However, in general, computing system 200 may be communicatively coupled to any of the sensors and devices described herein by either a wired or wireless communication link.

In general, any number of sensors and devices attached to collaborative robotic system 100, including sensors and devices to interact audibly, visually, and physically with a human collaborator may also be communicatively coupled to computing system 200.

As depicted in FIG. 5, computing system 200 includes a sensor interface 210, at least one processor 220, a memory 230, a bus 240, a wireless communication transceiver 250, and a controlled device interface 260. Sensor interface 210, processor 220, memory 230, wireless communication transceiver 250, and controlled device interface 260 are configured to communicate over bus 240.

Sensor interface 210 includes analog to digital conversion (ADC) electronics 211. In addition, in some embodiments, sensor interface 210 includes a digital input/output interface 212. In some other embodiments, sensor interface 210 includes a wireless communications transceiver (not shown) configured to communicate with a sensor to receive measurement data from the sensor.

As depicted in FIG. 5, ADC 211 is configured to receive signals 202 from image capture devices 108. In another non-limiting example, ADC 211 is configured to receive signals 203 from proximity sensing devices 105. In another non-limiting example, ADC 211 is configured to receive signals 204 from platform load sensing devices 104. ADC 211 is further configured to convert the analog signals 202-204 into equivalent digital signals suitable for digital storage and further digital processing. ADC 211 is selected to ensure that the resulting digital signal is a suitably accurate representation of the incoming analog signals (i.e., quantization and temporal discretization errors are within acceptable error levels). In some other embodiments, image capture devices 108, proximity sensing devices 105, and platform load sensing devices 104 include signal capture and processing capability on-board. In these embodiments, image data, proximity data, and load data are communicated digitally to computing system 200.

As depicted in FIG. 5, digital I/O 212 is configured to receive digital signals 201 from wheel sensing device 107. In this example, wheel sensing devices 107 include on-board electronics to generate digital signals 201 indicative of a measured displacement, velocity, etc., of each actuated wheel of wheeled robot 101. In this manner, computing system 200 is configured to interface with both analog and digital sensors. In general, any of the sensors described herein may be digital or analog sensors, and may be communicatively coupled to computing system 200 by the appropriate interface.

Controlled device interface 260 includes appropriate digital to analog conversion (DAC) electronics. In addition, in some embodiments, controlled device interface 260 includes a digital input/output interface. In some other embodiments, controlled device interface 260 includes a wireless communications transceiver configured to communicate with a device, including the transmission of control signals.

As depicted in FIG. 5, controlled device interface 260 is configured to transmit control commands 205 to one or more wheel actuators 102 that cause the collaborative robotic system 100 to move, for example, along a desired motion trajectory. In another non-limiting example, controlled device interface 260 is configured to transmit command signals (not shown) to an audio output device, such as a speaker, that causes the speaker to audibly communicate with a human collaborator. In yet another non-limiting example, controlled device interface 260 is configured to transmit display signals (not shown) to an image display device that causes the image display device to visually communicate with the human collaborator. In general, any combination of audio/visual input and output devices may be contemplated to implement a natural language communication interface between collaborative robotic system 100 and a human collaborator to facilitate collaborative task execution as described herein.

Memory 230 includes an amount of memory 231 that stores sensor data employed by collaborative robotic system 100 to navigate an environment while collaboratively executing a task with a human collaborator. Memory 230 also includes an amount of memory 232 that stores program code that, when executed by processor 220, causes processor 220 to implement payload transport task execution functionality including obstacle avoidance based on geometric models as described herein.

In some examples, processor 220 is configured to store digital signals generated by sensor interface 210 onto memory 230. In addition, processor 220 is configured to read the digital signals stored on memory 230 and transmit the digital signals to wireless communication transceiver 250. In some embodiments, wireless communications transceiver 250 is configured to communicate the digital signals from computing system 200 to an external computing device (not shown) over a wireless communications link. As depicted in FIG. 5, wireless communications transceiver transmits a radio frequency signal 252 over antenna 251. The radio frequency signal 252 includes digital information indicative of the digital signals to be communicated from computing system 200 to the external computing device. In one example, sensor data generated by computer system 200 are communicated to an external computing system (not shown) for purposes of monitoring and redirecting the robotic system 100 based on the sensor data.

In some embodiments, wireless communications transceiver 250 is configured to receive digital signals from an external computing device (not shown) over a wireless communications link. The radio frequency signals 253 includes digital information indicative of the digital signals to be communicated from an external computing system (not shown) to computing system 200. In one example, a geometric mesh model of robotic system 100 loaded with a payload generated by an external computing system (e.g., computing system 400 or computing system 500) are communicated to computer system 200 for implementation by robotic system 100. In some examples, an external computing system accesses additional sensor data (e.g., image data) that is otherwise unavailable to the collaborative robotic system 100. This additional sensor data is employed by the external computing system to update a motion trajectory of collaborative robotic system 100, for example, to avoid obstacles that are not within the field of view of collaborative robotic system 100.

In one example, robotic system 100 operates with a human collaborator to carry a large object (e.g., a desk) through a crowded environment (e.g., an office). FIGS. 6A-6D depict illustrations of robotic system 100 jointly moving a desk 130 with a human collaborator 120 through a crowded environment including object 125.

Figure 6A:
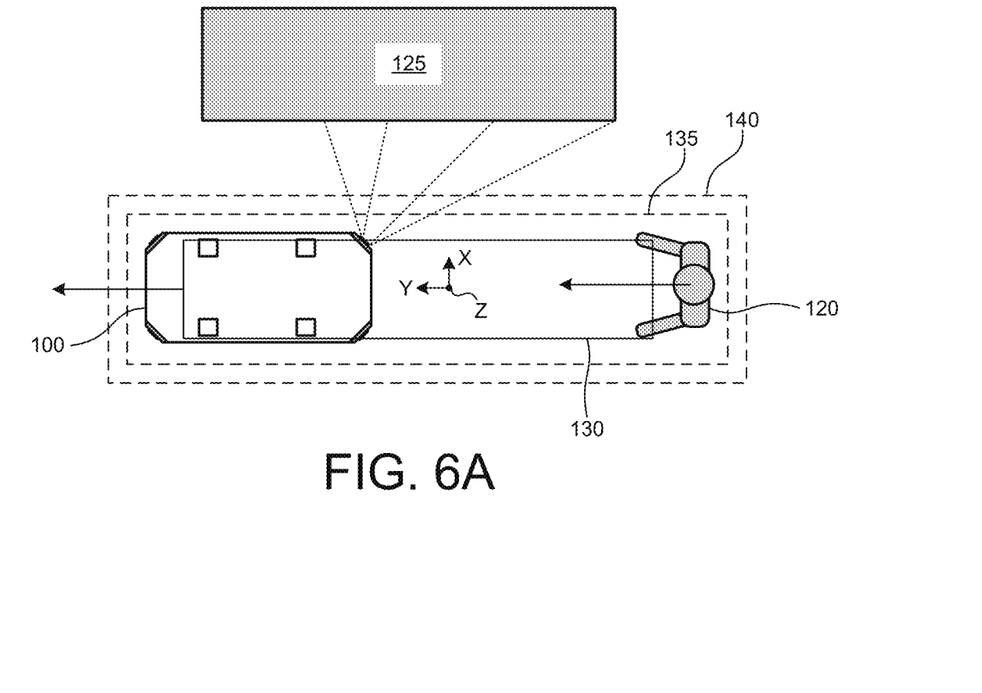
FIGS. 6A-6D depict illustrations of a payload robotic system jointly executing a task with a human collaborator involving moving an object through a crowded environment.

As depicted in FIG. 6A, robotic system 100 carries a portion of desk 130 on its payload platform and human collaborator 120 carries the remaining portion of desk 130. In the scenario depicted in FIG. 6A, robotic system 100 and human collaborator 120 move desk 125 in the Y-direction (i.e., from right to left across the drawing page). Human collaborator 120 provides general navigation instructions by applying forces to desk 130 in a plane parallel to the XY plane. Robotic system 100 measures a force applied to the payload in a plane parallel to the XY plane by human collaborator 120 based on force signals received from load sensors 104A-D. Computing system 200 determines a desired movement direction to be the direction of the measured force vector applied to the payload by the human collaborator in the plane parallel to the XY plane. For example, if the force applied to desk 130 in a plane parallel to the XY plane is aligned with the Y-direction, robotic system 100 determines the desired movement direction to be the Y-direction. However, if the force applied to desk 130 in a plane parallel to the XY plane is aligned with the X-direction, robotic system 100 determines the desired movement direction to be aligned with the X-direction.

Figure 6B:
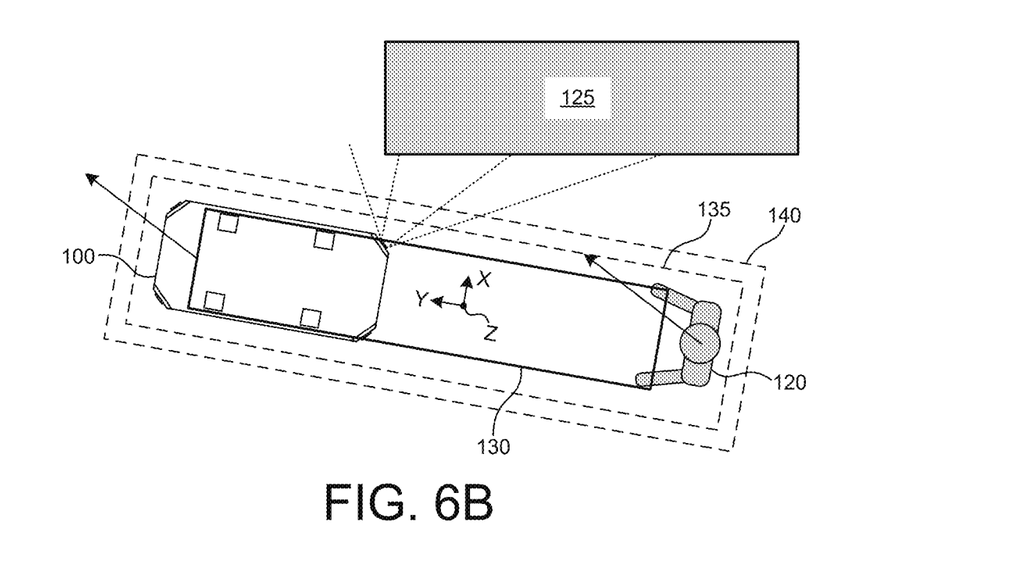

For example, as depicted in FIG. 6A, human collaborator 120 applies lateral forces to desk 130 in a direction aligned with the Y-direction. At this instant, robotic system 100 responds by moving in the Y-direction. However, as depicted in FIG. 6B, human collaborator 120 applies forces to desk 130 in a direction that includes both X and Y components. At this instant, robotic system 100 responds by moving in a direction aligned with the forces applied to desk 130 by human collaborator 120.

Figure 6C:
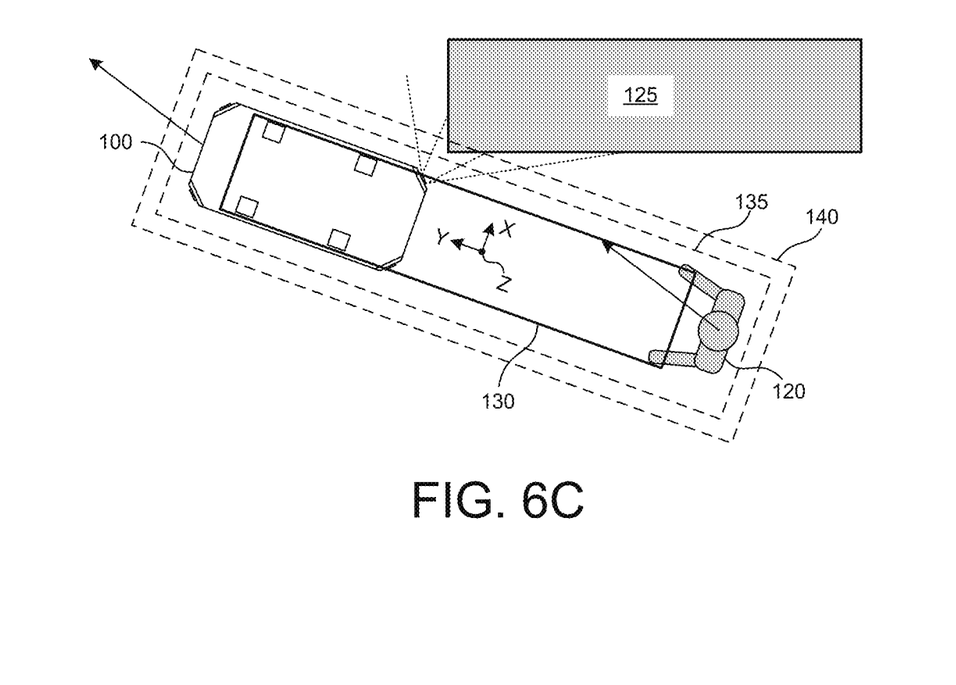

As depicted in FIGS. 6B and 6C, the forces applied to desk 130 (i.e., the navigational cues) by human collaborator 120 lead desk 130 on a collision course with object 125.

In another aspect, robotic system 100 overrides the navigational cues of the human collaborator to avoid collisions between an object in the environment and any of the robotic system itself, the human collaborator, the shared payload, or any combination thereof.

As depicted in FIGS. 6A-D, robotic system 100 monitors the position of objects in the surrounding environment relative to the robotic system 100, shared payload, and the human collaborator based on feedback from proximity sensors 105A-D, image capture devices 108, or a combination thereof. In the embodiment depicted in FIGS. 6A-D, robotic system 100 compares the measured position of object 125 relative to two virtual boundaries 135 and 140 maintained around robotic system 100, shared payload 130, and human collaborator 120. Virtual boundary 135 is considered a "hard" boundary, i.e., robotic system 100 should not navigate to any position that would allow an object in the surrounding environment to penetrate virtual boundary 135. Virtual boundary 140 is considered a "soft" boundary, i.e., robotic system 100 should navigate to a position that reduces the penetration of an object in the surrounding environment within virtual boundary 140.

In a further aspect, virtual boundaries 135 and 140 are defined based on a geometric model of the robotic system 100, payload 110, and human collaborator 120 determined by a collaborative scanning robot as described herein. In some examples, the virtual boundaries are defined by predetermined threshold distance values from the modeled dimensions of robotic system 100, shared payload 130, and human collaborator 120 defined by the geometric model. Virtual boundary 140 is defined by a larger set of predetermined threshold distance values than virtual boundary 135.

When robotic system 100 determines that object 125 is outside of virtual boundary 140, robotic system 100 takes no obstacle avoidance measures. In these instances, robotic system 100 communicates command signals to actuated wheels 102A-D of wheeled, robotic vehicle 101 that cause the wheeled, robotic vehicle 101 to move along the movement direction desired by human collaborator 120 as determined by the forces applied to desk 130 by human collaborator 120 as measured by load sensors 104A-D. In these instances, the velocity vector of robotic system 100, $\vec{v}_r$, is equal to the desired velocity vector as indicated by human collaborator 120, $\vec{v}_{desired}$, as indicated by equation (1).

$$\vec{v}_r = \vec{v}_{desired} \quad (1)$$

However, when object 125 begins to impinge on virtual boundary 140, robotic system 100 behaves differently. Rather, than completely following the navigational cues provided by human collaborator 120, robotic system 100 modifies the desired trajectory to avoid collision with object 125. In some embodiments, a proportional control algorithm is employed as indicated by equation (2), $$\vec{v}_{mod} = -K_p(d_{buffer} - d_{OB})\vec{v}^A_x + \vec{v}_{desired} \quad (2)$$

where, $\vec{v}_{desired}$, is the desired velocity indicated by human collaborator 120, $d_{OB}$, is the closest distance between object 125 and virtual boundary 135, $d_{buffer}$, is the distance between virtual boundaries 135 and 140 at the location of deepest impingement of object 125 into virtual boundary 140, $\vec{v}_{mod}$, is the modified velocity vector implemented by robotic system 100 to control the trajectory of robotic system 100, $v^A_x$, is the unit vector along the normal of the surface of object 125 which impinges on the buffer zone between virtual boundaries 135 and 140, and, $K_p$, is a constant value (i.e., the proportional gain associated with the control law indicated by equation (2)). In general, $K_p$ should be selected to result in an overdamped system response to maintain stability and avoid allowing robotic system 100 from navigating closer to object 125 than the minimum allowed distance to obstacles defined by virtual boundary 135. In some embodiments, the value of, $d_{buffer}$, i.e., the depth of the buffer zone defined by virtual boundaries 135 and 140, is scaled with the velocity of robotic system 100 in the direction of vector, $v^A_x$. In this manner, if robotic system 100 is approaching object 125 at a relatively high rate of speed, the depth of the buffer zone is increased to provide time to navigate around object 125. Similarly, if robotic system 100 is approaching object 125 at a relatively low rate of speed, the depth of the buffer zone is decreased to allow human collaborator 120 to move desk 130 closer to object 125 without robotic system 100 overriding the navigational cues provided by human collaborator 120.

Figure 7:
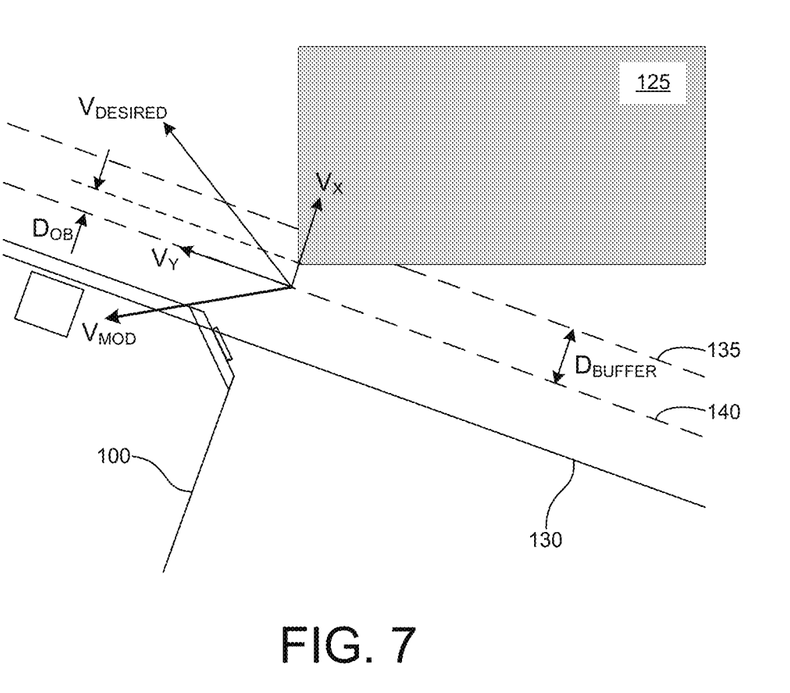
FIG. 7 depicts an illustration of the interaction between a payload robotic system and an object in the surrounding environment.

FIG. 7 illustrates the control law indicated by equation (2). At the instance depicted in FIG. 7, object 125 has impinged on virtual boundary 140. The magnitude of the impingement is the difference between the buffer distance, $D_{buffer}$, and the distance between object 125 and virtual boundary 135, $D_{OB}$. The desired velocity, $V_{desired}$, indicated by human collaborator 120 includes components in a direction, $V_x$, normal to the surface of object 125 where it impinges on the buffer zone between virtual boundaries 135 and 140, and a direction, $V_y$, tangent to the surface of object 125 where it impinges on the buffer zone between virtual boundaries 135 and 140. To avoid collision, the $V_y$ component of $V_{desired}$ is not a concern, but robotic system 100 determines a modified control velocity, $V_{mod}$, that counteracts the $V_x$ component of $V_{desired}$, for example, as indicated by the control law presented in equation (2).

Figure 6D:
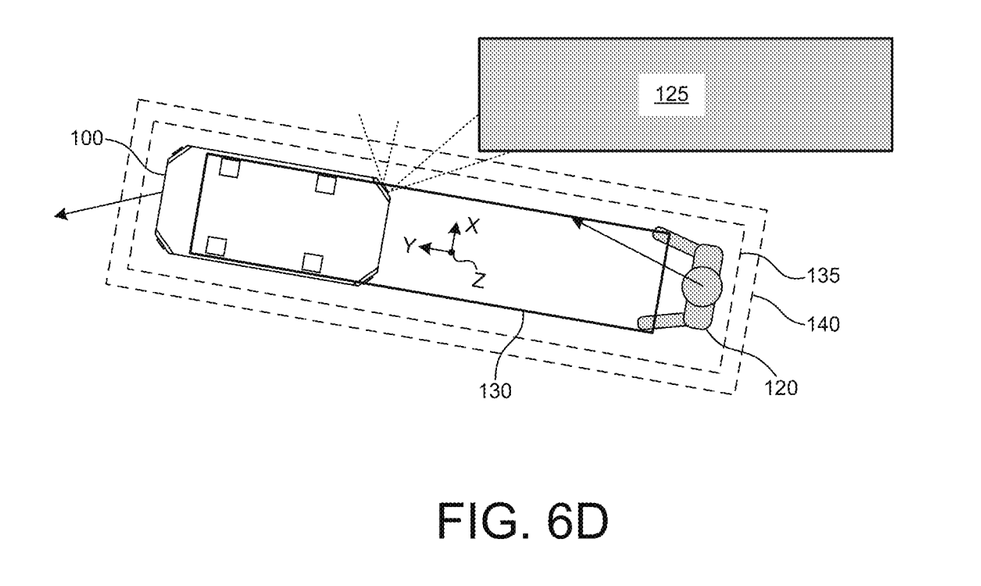

As depicted in FIGS. 6C and 6D, robotic system 100 implements a modified control velocity to navigate robotic system 100 and desk 130 away from object 125. In general, objects in the surrounding environment, e.g., object 125, may be stationary or moving relative to ground.

In some embodiments, human collaborator 120 is not involved in the transportation of payload 130. In these embodiments, robotic system 100 carries payload 130 in its entirety and navigates the surrounding environment with payload 130. In these embodiments, a geometric model of robotic system 100 loaded with payload 130 is determined as described herein, and robotic system 100 employs this model to define virtual boundaries and execute obstacle avoidance as described herein. In these embodiments, robotic system 100 defines its motion trajectory without influence from a human collaborator. However, robotic system 100 modifies/updates its motion trajectory to avoid obstacles based on impingement of a virtual boundary (e.g., virtual boundary 140) by objects in the surrounding environment (e.g., object 125) as described herein.

Figure 8:
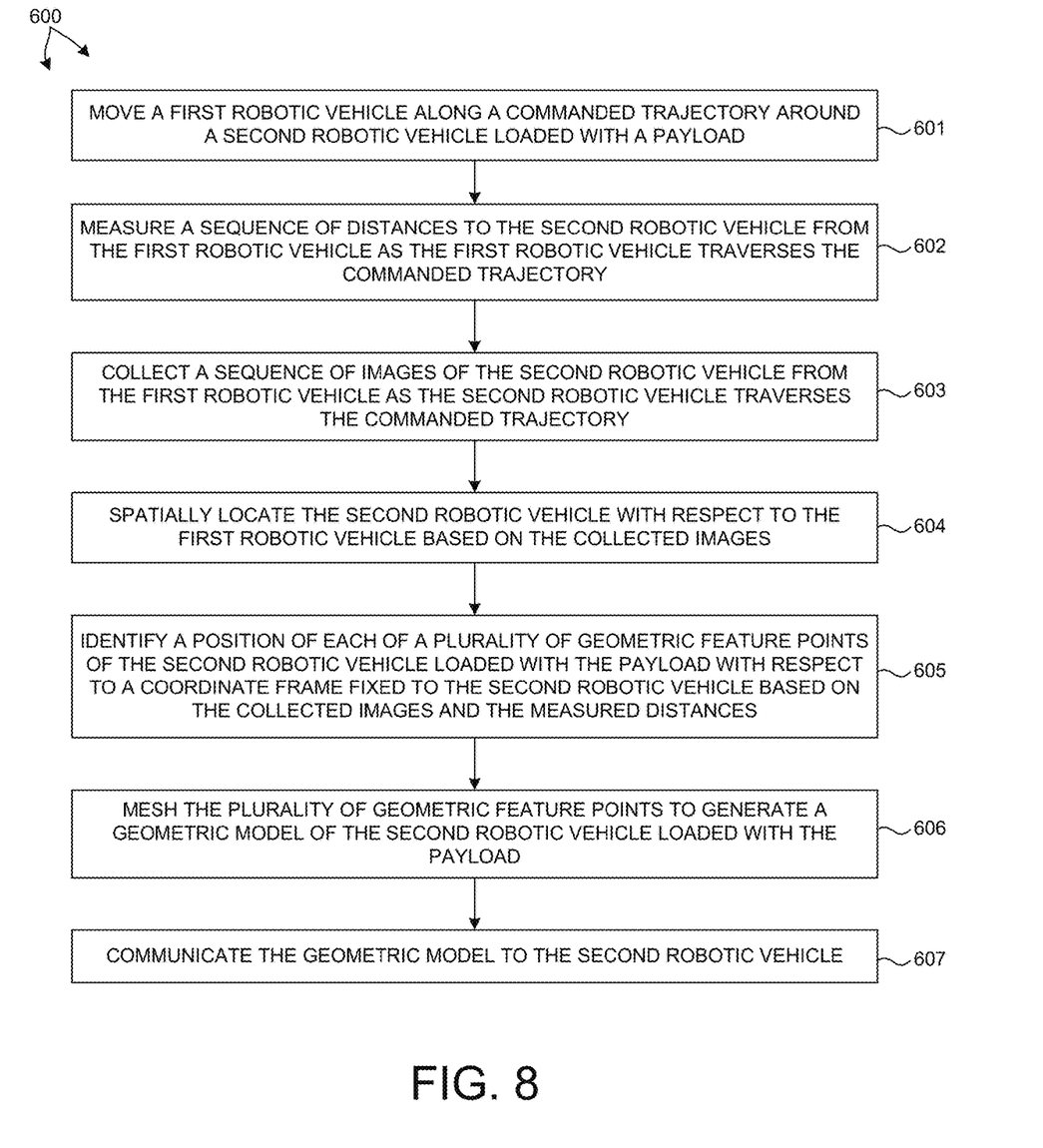
FIG. 8 illustrates a flowchart of a method 600 for collaboratively determining a load footprint of a payload robot as described herein.

FIG. 8 illustrates a flowchart of a method 600 suitable for implementation by a collaborative robotic system as described herein. In some embodiments, a collaborative robotic system described with reference to FIGS. 1-2 is operable in accordance with method 600 illustrated in FIG. 8. However, in general, the execution of method 600 is not limited to the embodiments of the collaborative robotic system described with reference to FIGS. 1-2. These illustrations and corresponding explanation are provided by way of example as many other embodiments and operational examples may be contemplated within the scope of this patent document.

In block 601, a first robotic vehicle moves along a commanded trajectory around a second robotic vehicle loaded with a payload.

In block 602, a sequence of distances to the second robotic vehicle from the first robotic vehicle is measured as the first robotic vehicle traverses the commanded trajectory.

In block 603, a sequence of images of the second robotic vehicle is collected from the first robotic vehicle as the second robotic vehicle traverses the commanded trajectory.

In block 604, the second robotic vehicle is spatially located with respect to the first robotic vehicle based on the collected images.

In block 605, a position of each of a plurality of geometric feature points of the second robotic vehicle loaded with the payload with respect to a coordinate frame fixed to the second robotic vehicle is identified based on the collected images and the measured distances.

In block 606, the plurality of geometric feature points are meshed to generate a geometric model of the second robotic vehicle loaded with the payload.

In block 607, the geometric model is communicated to the second robotic vehicle.

The computing systems 200, 400, and 500 may include, but is not limited to, a personal computer system, mainframe computer system, workstation, image computer, parallel processor, or any other computing device known in the art. In general, the term "computing system" may be broadly defined to encompass any device, or combination of devices, having one or more processors, which execute instructions from a memory medium. In general, computing systems 200, 400, and 500 may be integrated with a robot, such as robotic systems 100 and 300, or alternatively, may be separate, entirely, or in part, from any robot. In this sense, computing systems 200, 400, and 500 may be remotely located and receive data, transmit data, and transmit command signals to any element of robotic system 100 and 300.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above.

Accordingly, various modifications, adaptations, and combinations of various features of the described embodiments can be practiced without departing from the scope of the invention as set forth in the claims.

What is claimed is:

1. A system comprising:
    a first robotic vehicle including one or more actuators that cause the first robotic vehicle to move along a commanded trajectory around a second robotic vehicle loaded with a payload;
    one or more distance sensors coupled to the first robotic vehicle, the one or more distance sensors configured to measure a distance to the second robotic vehicle as the first robotic vehicle traverses the commanded trajectory;
    one or more image capture devices coupled to the first robotic vehicle, the one or more image capture devices configured to image the second robotic vehicle as the first robotic vehicle traverses the commanded trajectory; and
    one or more computing systems configured to:
        spatially locate the second robotic vehicle with respect to the first robotic vehicle based on images collected by the one or more image capture devices as the first robotic vehicle traverses the commanded trajectory;
        identify a position of each of a plurality of geometric feature points of the second robotic vehicle loaded with the payload with respect to a coordinate frame fixed to the second robotic vehicle based on images collected by the one or more image capture devices and the distances collected by the one or more distance sensors as the first robotic vehicle traverses the commanded trajectory;
        mesh the plurality of geometric feature points to generate a geometric model of the second robotic vehicle loaded with the payload; and
        communicate the geometric model to the second robotic vehicle.

2. The system of claim 1, wherein a field of view of the one or more image capture devices includes a field of view of the one or more distance sensors.

3. The system of claim 1, wherein the locating of the second robotic vehicle with respect to the first robotic vehicle as the first robotic vehicle traverses the commanded trajectory is based on images collected by the one or more image capture devices of a plurality of fiducial tags fixed to the second robotic vehicle.

4. The system of claim 1, wherein the one or more image capture devices include a three channel camera, and wherein the images collected by the one or more image capture devices include three different color channels.

5. The system of claim 1, wherein the identifying the position of each of the plurality of geometric feature points with respect to the coordinate frame fixed to the second robotic vehicle involves a homography.

6. The system of claim 1, wherein the computing system is further configured to:
    cluster the plurality of geometric feature points; and
    discard geometric feature points not within a cluster that includes a center point of the second robotic vehicle loaded with the payload.

7. The system of claim 1, wherein the computing system is further configured to:
    match geometric feature points between each subsequent image frame; and
    merge duplicate geometric feature points.

8. A method comprising:
    moving a first robotic vehicle along a commanded trajectory around a second robotic vehicle loaded with a payload;
    measuring a sequence of distances to the second robotic vehicle from the first robotic vehicle as the first robotic vehicle traverses the commanded trajectory;
    collecting a sequence of images of the second robotic vehicle from the first robotic vehicle as the second robotic vehicle traverses the commanded trajectory;
    spatially locating the second robotic vehicle with respect to the first robotic vehicle based on the collected images;
    identifying a position of each of a plurality of geometric feature points of the second robotic vehicle loaded with the payload with respect to a coordinate frame fixed to the second robotic vehicle based on the collected images and the measured distances;
    meshing the plurality of geometric feature points to generate a geometric model of the second robotic vehicle loaded with the payload; and
    communicating the geometric model to the second robotic vehicle.

9. The method of claim 8, wherein the locating of the second robotic vehicle with respect to the first robotic vehicle as the first robotic vehicle traverses the commanded trajectory is based on the sequence of images including a plurality of fiducial tags fixed to the second robotic vehicle.

10. The method of claim 8, wherein each of the sequence of images includes three different color channels.

11. The method of claim 8, wherein the identifying the position of each of the plurality of geometric feature points with respect to the coordinate frame fixed to the second robotic vehicle involves a homography.

12. The method of claim 8, further comprising:
    clustering the plurality of geometric feature points; and
    discarding geometric feature points not within a cluster that includes a center point of the second robotic vehicle loaded with the payload.

13. The method of claim 8, further comprising:
    matching geometric feature points between each subsequent image frame; and
    merging duplicate geometric feature points.

14. A system comprising:
    a first robotic vehicle including one or more actuators that cause the first robotic vehicle to move along a commanded trajectory around a second robotic vehicle loaded with a payload;
    one or more distance sensors coupled to the first robotic vehicle, the one or more distance sensors configured to measure a distance to the second robotic vehicle as the first robotic vehicle traverses the commanded trajectory;

one or more image capture devices coupled to the first robotic vehicle, the one or more image capture devices configured to image the second robotic vehicle as the first robotic vehicle traverses the commanded trajectory; and a non-transitory, computer-readable medium storing instructions that when executed by a computing system cause the computing system to:

spatially locate the second robotic vehicle with respect to the first robotic vehicle based on images collected by the one or more image capture devices as the first robotic vehicle traverses the commanded trajectory;

identify a position of each of a plurality of geometric feature points of the second robotic vehicle loaded with the payload with respect to a coordinate frame fixed to the second robotic vehicle based on images collected by the one or more image capture devices and the distances collected by the one or more distance sensors as the first robotic vehicle traverses the commanded trajectory;

mesh the plurality of geometric feature points to generate a geometric model of the second robotic vehicle loaded with the payload; and communicate the geometric model to the second robotic vehicle.

15. The system of claim 14, wherein the locating of the second robotic vehicle with respect to the first robotic vehicle as the first robotic vehicle traverses the commanded trajectory is based on images collected by the one or more image capture devices of a plurality of fiducial tags fixed to the second robotic vehicle.

16. The system of claim 14, wherein the one or more image capture devices include a three channel camera, and wherein the images collected by the one or more image capture devices include three different color channels.

17. The system of claim 14, wherein the identifying the position of each of the plurality of geometric feature points with respect to the coordinate frame fixed to the second robotic vehicle involves a homography.

* * * * *